(No Model.) 2 Sheets—Sheet 1.
W. SCHMID.
PHOTOGRAPHIC CAMERA.
No. 369,818. Patented Sept. 13, 1887.
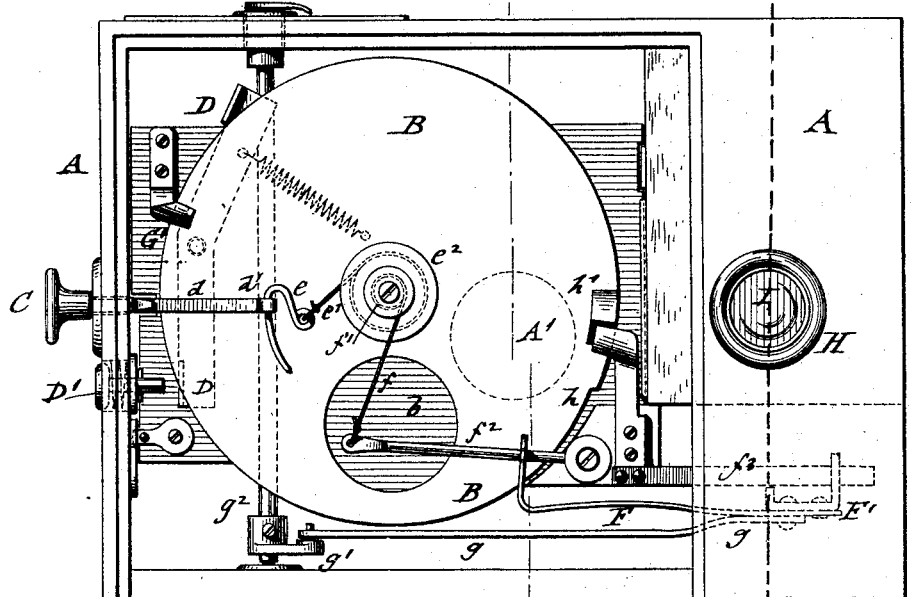
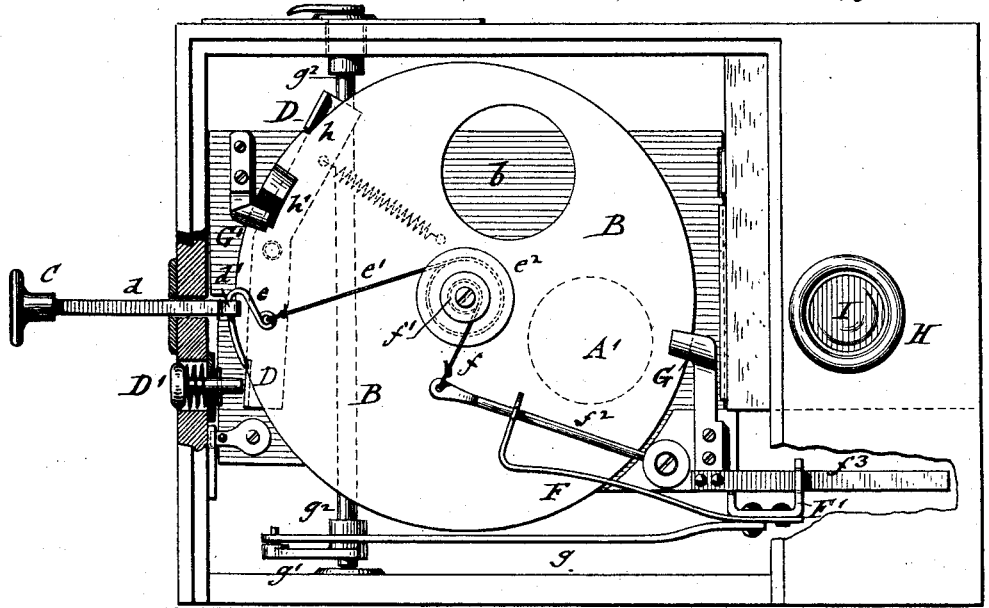
WITNESSES:
Jno. K. Rosenbaum.
Martin Petry.
INVENTOR
William Schmid
BY
Goepel & Raegener
ATTORNEYS.

(No Model.) 2 Sheets—Sheet 2.

W. SCHMID.
PHOTOGRAPHIC CAMERA.

No. 369,818. Patented Sept. 13, 1887.

WITNESSES:
J. N. Rosenbaum.
Martin Petry.

INVENTOR
William Schmid
BY
Goepel & Raegener
ATTORNEYS.

UNITED STATES PATENT OFFICE.

WILLIAM SCHMID, OF BROOKLYN, NEW YORK.

PHOTOGRAPHIC CAMERA.

SPECIFICATION forming part of Letters Patent No. 369,818, dated September 13, 1887.

Application filed November 20, 1885. Serial No. 183,423. (No model.)

*To all whom it may concern:*

Be it known that I, WILLIAM SCHMID, of Brooklyn, in the county of Kings and State of New York, have invented certain new and useful Improvements in Photographic Cameras, of which the following is a specification.

This invention relates to certain improvements in the photographic camera for which Letters Patent was granted to me, No. 270,133, dated January 2, 1883, the improvements being designed with a view to vary the time of exposure, and with a view to facilitate the sighting and centering of the image of the object on an auxiliary plate of ground glass used in connection with the camera.

The invention consists of a photographic camera in which a rotary shutter having an opening is passed quickly over the main tube when the retaining mechanism is released, which is accomplished at different speeds by a pivot-arm connected to the hub of the shutter, a sliding spring capable of adjustment on a fixed rail, and suitable operating mechanism.

The invention consists, secondly, of certain details of construction, which will be fully described hereinafter, and finally pointed out in the claims.

Figure 3:
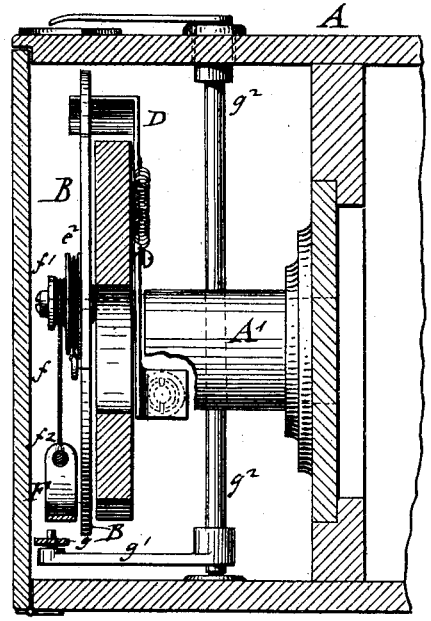
Figure 4:
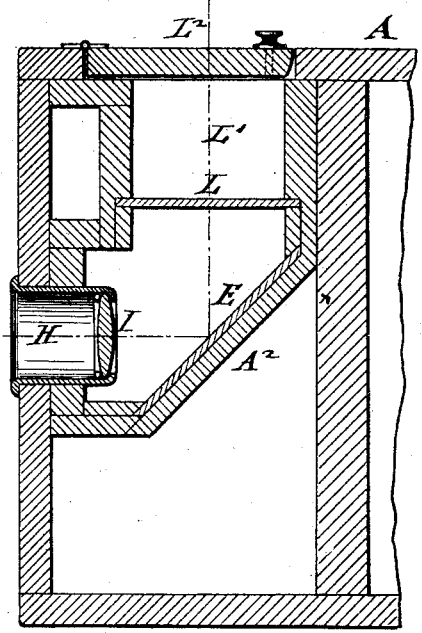
Figure 5:
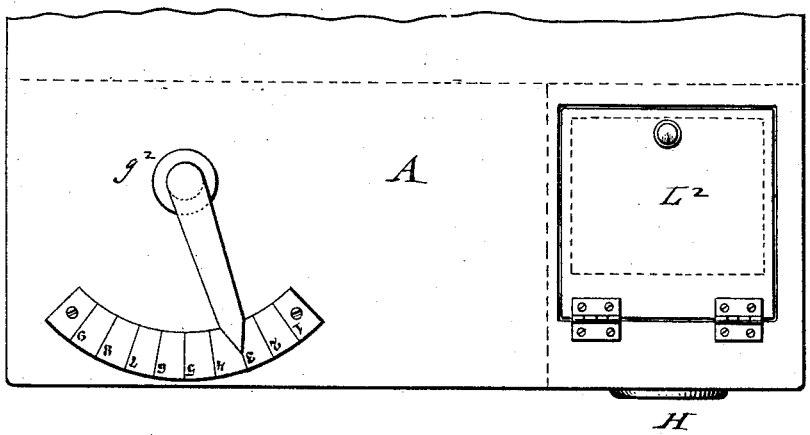

In the accompanying drawings, Figure 1 represents a front elevation of my improved photographic camera with the lid removed, showing the shutter in its normal position of rest. Fig. 2 is also a front elevation, partly in section, of the camera, showing the shutter in position before exposure. Fig. 3 is a vertical longitudinal section on line $x\,x$, Fig. 1. Fig. 4 is a vertical longitudinal section on line $y\,y$, Fig. 1; and Fig. 5 is a plan of the front part of the camera.

Similar letters of reference indicate corresponding parts.

In the drawings, A represents the case of a photographic camera of that class known as "detective cameras." When applied for use, these cameras are usually carried under the arm, focussed by suitable mechanism, and the image of the object centered by a supplemental tube and lens, inclined deflector, and ground glass plate, as described in my prior patent referred to.

A shutter, B, of disk shape, is centrally pivoted in front of and sidewise of the main tube and lens, and provided with an opening, $b$, of a size coinciding with the size of the main tube. The shutter B is preferably made of hard-rubber and rotated on its axis by any suitable mechanism, either by opening the front lid of the case A and then turning the shutter, or, without opening the lid, by pulling a button, C, which is applied to a guide-rod, $d$, the inner end of which is connected by an eye, $d'$, to a hook, $e$, at the end of a cord, $e'$, that is wound around a pulley, $e^2$, attached to the hub of the shutter B. By pulling the button C the cord $e'$ is unwound, but at the same time a second cord, $f$, is wound up in opposite direction on a second pulley, $f'$, on the hub of the shutter, the second cord being attached to a pivot-arm, $f^2$, that is engaged by a strong spring, F, as shown in Figs. 1 and 2. The spring F is attached at its opposite end to a slide-piece, F', which is adjustable along a fixed rail, $f^3$, so that the spring F is adapted to engage the pivot-arm $f^2$ nearer to or farther away from its pivot, and exert thereby a greater or smaller force on the same. The adjustment of the slide-piece F' may be accomplished by a connecting-rod, $g$, that is pivoted to the slide-piece F' and a crank-arm, $g'$, which latter is keyed to a vertical shaft, $g^2$, that is supported in suitable step-and-neck bearings of the case A. The shaft $g^2$ is passed to the outside of the case, and provided with a pointer that moves on a graduated index-plate, so as to regulate the degree of force exerted by the spring on the slide-piece, and consequently the speed by which the opening $b$ of the shutter B is passed over the main tube A' when the shutter is released.

When the button C is pulled out as far as its rod $d$ admits, the shutter B is turned on its axis until a notch, $h$, at its circumference is engaged by a fulcrumed and spring-actuated detent, D, as shown in Fig. 2. The lower end of the detent D is engaged by a spring-actuated trigger, D', which, on being pressed upon, moves the detent away from the circumference of the shutter B, so as to release the notch $h$ and permit the same to rotate quickly until a wedge-shaped projection, $h'$, near the notch $h$, is engaged by a fixed stop, G, as shown in Fig. 1. A second stop, G', arrests the shutter when the same is moved in opposite direction for being retained by the detent D. At the moment when the trigger D' is depressed the shutter is released, so that its opening b is thrown at a considerable speed past the opening of the main tube, so that the light can act on the sensitized plate at the moment when the opening of the shutter passes the main tube. According as the exposure has to be shorter or longer, the shutter has to be moved at more or less speed, which is accomplished by the adjustment of the spring F' on the pivot-arm $f^2$, as before described.

Sidewise of the main tube A' is arranged a supplementary tube, H, and lens I, which is arranged, preferably, at the same level as the main tube and lens. Back of the lens I is arranged an inclined deflector, E, and a horizontal ground-glass plate, L, above the same, the deflector and plate being inclosed by a supplementary casing, $A^2$, into which the tube H and lens I extend. Above the glass plate L is arranged a dark chamber, L', which may be closed by a hinged lid, $L^2$, that is opened when the picture is to be taken. When the image of the object to be photographed is centered on the ground-glass plate, the image of the object is also properly centered on the photographic plate.

By the arrangement of the dark chamber L' above the ground-glass plate L the image of the object is more distinctly sighted on the ground-glass plate, as the light-rays interfere to a smaller extent with the image than when the ground-glass plate is arranged at the top of the case, as in my former patent.

Having thus described my invention, I claim as new and desire to secure by Letters Patent—

1. The combination, in a photographic camera, of a rotary shutter having an opening coinciding with the main tube, a pulley on the hub of the shutter, a pivot-arm connected by a cord with said pulley, a spring applied at one end to the pivot-arm, and mechanism for increasing or decreasing the tension of said spring, substantially as set forth.

2. The combination, with a main tube, of a rotary shutter having an opening coinciding with the main tube and a pulley on its hub, a pivot-arm connected by a cord with said pulley, a spring connected at one end to the pivot-arm, a slide-piece attached to the opposite end of the spring, and mechanism for setting the slide-piece and adjusting the spring on the pivot-arm, so as to move the shutter at a greater or smaller speed past the main tube, substantially as set forth.

3. The combination, with a main tube, of a rotary shutter having an opening coinciding with said tube, a detent for retaining the shutter, a trigger for releasing said detent, a pivot-arm connected by a cord and pulley to the hub of the shutter, a spring connected to the pivot-arm, an adjustable slide-piece attached to the spring, and mechanism for setting the slide-piece so as to adjust the spring on said pivot-arm, substantially as set forth.

4. The combination, with a main tube and lens, of a rotary shutter having an opening coinciding with said main tube, a detent engaging the shutter, a trigger for releasing said detent, a pivot-arm connected by a cord and pulley to the hub of the shutter, a spring connected to the pivot-arm, a slide-piece attached to the opposite end of the spring, a fixed rail for guiding said slide-piece, and mechanism for setting the slide-piece on said rail, substantially as set forth.

In testimony that I claim the foregoing as my invention I have signed my name in presence of two subscribing witnesses.

WILLIAM SCHMID.

Witnesses:
PAUL GOEPEL,
SIDNEY MANN.